United States Patent [19]

Yasuda

[11] 4,297,447

[45] Oct. 27, 1981

[54] COMPOUND FOR COATING CONTAINING FLUOROCARBONPOLYMER AND METHOD FOR ITS MANUFACTURE

[75] Inventor: Toshio Yasuda, Naka, Japan

[73] Assignee: Elastoflon Inc., Woodmere, N.Y.

[21] Appl. No.: 153,967

[22] Filed: May 28, 1980

Related U.S. Application Data

[63] Continuation of Ser. No. 930,580, Aug. 3, 1978, abandoned, which is a continuation-in-part of Ser. No. 684,639, May 12, 1976, abandoned.

[51] Int. Cl.$^3$ .................... C08L 63/00; C08L 75/04; C08L 61/04; C08L 27/18
[52] U.S. Cl. .................... 525/133; 525/108; 525/111; 525/125; 525/129
[58] Field of Search ............... 525/108, 111, 125, 129, 525/133

[56] References Cited

U.S. PATENT DOCUMENTS

| | | | |
|---|---|---|---|
| 2,976,257 | 3/1961 | Dawe | 260/837 R |
| 3,148,234 | 9/1964 | Boyer | 260/859 R |
| 3,198,691 | 8/1965 | Thomas | 260/837 R |
| 3,222,433 | 5/1967 | Rentschler | 260/859 R |
| 3,223,676 | 12/1965 | Rucker | 260/845 |
| 3,253,057 | 5/1966 | Landler | 260/845 |
| 3,293,203 | 12/1966 | Paulus | 260/859 R |
| 3,344,064 | 9/1967 | Brady | 260/859 R |
| 3,670,049 | 6/1972 | Stein | 260/858 |
| 3,716,599 | 2/1973 | Vasta | 260/859 R |
| 3,751,520 | 8/1973 | Yasuda | 260/859 R |
| 3,772,236 | 11/1973 | Soons | 260/859 R |
| 3,853,690 | 12/1974 | McGarry | 260/837 R |
| 3,882,191 | 5/1975 | Balatoni | 260/830 P |

FOREIGN PATENT DOCUMENTS

| | | |
|---|---|---|
| 668446 | 8/1963 | Canada ............... 260/837 R |
| 2052681 | 6/1971 | Fed. Rep. of Germany . |
| 48-17549 | 5/1973 | Japan . |
| 48-33021 | 10/1973 | Japan . |
| 1018269 | 1/1966 | United Kingdom . |
| 1064840 | 4/1967 | United Kingdom . |

Primary Examiner—Paul Lieberman
Attorney, Agent, or Firm—Holland, Armstrong, Wilkie & Previto

[57] ABSTRACT

A fluorocarbonpolymer material for coating flexible and other surfaces, said material comprising an elastic material and adhesive, and the process for making the said material.

24 Claims, No Drawings

COMPOUND FOR COATING CONTAINING FLUOROCARBONPOLYMER AND METHOD FOR ITS MANUFACTURE

This is a continuation of application Ser. No. 930,580 filed Aug. 3, 1978, which was a continuation in part of application Ser. No. 684,639, filed May 12, 1976 both abandoned.

There is no drawing.

The invention is of concern to a compound which contains fluorocarbonpolymer and possesses rubber-like elasticity. Further in detail, the invention is concerned with a coating compound as described below and the method of manufacture of such compound to be coated on the surface of any object to form a coating film thereon having property of self-lubrication which is peculiar to fluorocarbonpolymer and holding characteristic of free deformation in elongation, bending and contraction by the effect of external force but can be restored to original state after relief of such external force.

All of fluorocarbonpolymer such as polytetrafluoroethlene (abbreviated to PTFE hereunder), tetrafluoroathylenehexafluoropropylenecopolymer (abbreviated to FEP hereunder) have self-lubrication and non-adhesive characteristics so that they are widely utilized for industrial and household uses as the fine powder of such polymers applied on the surface of objects can be heated to melt to produce very slippery or non-adhesive film. However, the process to heat to melt such fluorocarbonpolymer after coated on the surface of an object is considerably complicated and it is impossible to apply heat on any object which may be deteriorated by heating as the melting point of such polymer coated on the surface of an object are too high.

Therefore, there is also prevailing such method that to coat a compound consists of fine powder of fluorocarbonpolymer or liquid dispersion of it combined with thermoplastic or thermosetting resin on the surface of an object to constitute a slippery or non-adhesive film thereon by letting the film dry in air or only to dry up by heat under temperature less than the melting point of fluorocarbonpolymer to avoid deterioration of the object. For instance, U.K. Pat. No. 1,018,269 specifies that a compound consisting of low molecular weight PTFE and thermoplastic or thermosetting resin can form hard film under normal temperature and it is possible to obtain fluorocarbon coating film with this compound not only on the surface of metallic object but even on the surface of wood or paper which is quite liable to be deteriorated by heat. It is also specified in the Japanese Patent Gazette No. SHO 48-33021 and the U.K. Pat. No. 1,064,840 about a compound consisting of FEP organosol and thermoplastic or thermosetting resin and the Japanese Patent Gazette No. SHO 48-17549 explains about a compound consisting of mixed organosol of FEP and PTFE and thermoplastic or thermosetting resin. The Japanese Patent Gazette No. SHO 48-33021 for example, cites the possibility of obtaining fluorocarbonpolymer film that can be applied on an object at a temperature below the Melting Point of the fluorocarbonpolymer by combining with air drying film forming materials such as Polybutadiene, Polyvinylchloride, Epoxy resin, silicone, acrylic polymer and its copolymer, 3-(B-metacryloxyethyl)-2.2-Spylosicrohexyloxasoline, Nitrocellulose, phenolformaldehyde resin, aminoplasto resin, polyurethane, polyester, polyamid, polycarbonate, cyclicvinylacetate, etc., or their mixtures. It is acknowledged that the 3 above mentioned arts can produce coating film of fluorocarbonpolymer on the surface of an object by heating the coated film with temperature lower than the melting point of fluorocarbonpolymer.

However, it is obvious through the reports of practical tests included in the specifications of the above patents that every thermoplastic or thermosetting resin employed for individual purpose as film forming material combined with fluorocarbonpolymer can adhere firmly to hard objects such as metallic materials but its film is very hard and short of properties of elongation and flexibility. Therefore, when any one of such compound as mentioned above was applied on the surface of rubber or rubber-like elastic object and dried by normal temperature or heat-treated by predetermined temperature to form the surface coating film the film will easily be cracked by bending or compressing external force owing to the hard film created by the film forming material and also due to the virtual characteristics of rubber or rubber-like elastic object which may have been deteriorated by heat for treating the thermosetting resin in case it was used in lieu of thermoplastic resin. Virtually, rubber or rubber-like elastic material is high in friction strength, but if we can minimize the friction strength of the surface of rubber or rubber-like material and can fully utilize its elasticity and flexibility, the field of application of it should be much extended and, therefore, in order to give self-lubrication and non-adhesive characteristics of fluorocarbonpolymer to the surface of rubber or rubber-like elastic material, it was tried, for instance, to fill it with fine powder of PTFE or FEP but it was found very difficult to make float the fine powder of PTFE or FEP up to the surface of rubber or rubber-like material as it was so high in viscosity that needed to mix and blend at least 50% in weight of fine powder of PTFE or FEP with rubber or rubber-like material to achieve a successful result of slippery surface of it. The method such as above is not pracitcally useful as it will derive high cost of product by the use of a lot of fluorocarbonpolymer and also will cause considerable deterioration of original characteristics or rubber or rubber-like material.

For the reason as mentioned above, it is actually impossible to make a coating film having characteristics of slipping and flexibility of deformation on the surface of rubber or rubber-like material without deteriorating the original nature of such basic object.

The inventor of the invention has prepared several compounds consisting of a wax-like low molecular weight PTFE as being used by the U.K. Pat. No. 1,018,269 or FEP organosol as specified in the U.K. Pat. No. 1,064,840 or PTFE-FEP mixed organosol as described in the Japanese Patent Gazette No. SHO 48-17548 and soft type rubber-like elastic material polyurethane rubber or polychloroprene in solution as film forming material in lieu of thermoplastic or thermosetting hard type film forming material as also being used by all of the above patents. Each of the compound produced as above was coated on the surface of rubber and rubber-like object and dried to form a film respectively and then the characteristic of each firm was investigated. The result of the investigation proved that it was possible to obtain the film having good flexibility from films having ratio of composition of fluorocarbonpolymer and rubber-like elastic material within the range of 20/80-60/40. However, it was noted that the coating film applied on some kind of object showed poor adhesion due to the nature of the object and further it was learned that the coating film was somewhat short in slippery characteristic which derived from the softness of the film itself.

Now, the inventor has found after his close scrutiny that it was possible to produce a compound for coating the surface of an object to create a film which is self-lubricative as peculiar to fluorocarbonpolymer and flexibly deform itself in elongation, bending and contraction according to external force but can restore to its original state after relieving such external force. The method of manufacture of the compound is to add proper ratio of a polymer as the third ingredient of aforementioned two element compound which consists of fluorocarbonpolymer and rubber-like elastic material. The third ingredient is a polymer which can form by itself a hard or semi-hard film with strong adhesive strength to the object on which it was applied and having characteristics of compatibility with the rubber-like elastic material.

When the compound "b" formed from the 3 elements through the addition of appropriate amounts of hard or semi-hard type polymer (III) having strong bonding strength besides having property of compatibility with rubber-like elastic material (II) to the compound "a" formed only from the 2 elements fluorocarbonpolymer (I) and the rubber-like elastic material (II), the resultant film was found invariably to have a practical level of flexibility. However, when the ratio of fluorocarbonpolymer (I) used in the formultaion was kept the same in both compounds "a" and "b", the resultant film in the case of the compound "b" as compared to that for compound "a" was found to be clearly superior in the strength of bond on the object coated and in the slipperiness.

As cited in the application examples that follow later, the objective of this invention is achieved only when hard or semi-hard type polymer having compatibility with rubber-like elastic material (II) in the compound comprising of fluorocarbonpolymer (I) and rubber-like elastic material (II) is added. If however, hard or semi-hard type polymer having no compatibility with the rubber-like elastic material (II) is used, then it is not at all possible to acquire the level of effectiveness of this invention.

The fluorocarbonpolymer used as principal ingredient of the compounds relating to this invention is a homopolymer of tetrafluoroethylene (referred to hereinafter as TFE) and copolymer having TFE as the main ingredient, namely a single or mixed materials of polymers such as PTFE, FEP, or tetrafluoroethylenealkylvynilether copolymer which are mechanically pulverized into grain with diameter less than 5 mu or organosol as specified in the U.K. Pat. No. 1,064,840 and the Japanese Patent Gazette No. SHO 48-17548 and all of the above polymers have characteristics of self-lubrication. The rubber or rubber-like elastic material to be used as element (II) of this invention shall be any material subject to soluble with organic solvent and can form adhesive and homogeneous film on the surface of object after coated thereon and dried up.

As adhesive and rubber-like elastic material for the above purpose, there are synthetic rubbers such as nitrile rubber, chloroprene rubber and copolymer of ethylene-vinyl-acetate or polyurethane rubber, however, the best of all for this invention is the soft polyurethane rubber which excels the others in mechanical application and possesses properties of resistance to oil, heat, abrasion and has the strongest tearing strength amongst all kinds of elastic rubber-like materials as well as very good adhesive strength to any object in a wide range. Especially it is preferable to use thermoplastic polyurethane rubber which is readily soluble with organic solvent.

The material to be used for the element (III) of this invention must be selected from materials which are completely or partially compatible and are soluble in an organic solvent common to element (II), viz, the rubber-like elastic material. For example, when using soft polyurethane rubber as element (II) the material to be combined with it as element (III) shall be selected from thermosetting or cold-setting epoxy resin, thermoplastic resin of acrylic group, especially polymethyleacrylate, polymethylemethacrylate and hard or semi-hard urethane which is usually called as polyurethane paint or polyurethane binding agent.

In case of using nitrile rubber of chloroprene rubber as element (II), phenol resin should be used as element (III). The ratio of ingredients of the coating compounds of this invention differs depending upon the purpose of use, but usually the ratio of fluorocarbonpolymer (I), rubber-like elastic material (II) and adhesive strength reinforcing agent (III) which is completely or partially compatible with (II) is (I)/(II)+(III)=20/80–80/20 and preferably in the range of 30/70–60/40 and the ratio of composition of (II) and (III) in the above composition shall be (II)/(III)=95/5–30/70 and preferably in the range of 90/10–40/60.

The coating compound relating to this invention is produced by mixing and dispersing uniformly fine powder or organosol of fluorocarbonpolymer (I), rubber-like elastic material (II) and adhesive strength reinforcing agent (III) is an organic solvent. It is desirable in this case to have the rubber-like elastic material (II) and adhesive strength reinforcing agent (III) in a condition where they are uniformly mixed and dissolved in a common solvent. If the mixing of (II) and (III) is not thorough or incomplete, it would not be possible to obtain film that would conform or meet the objective of this invention when the derived compound is coated and dried on an object. Usually these ingredients and the solvent can be dissolved and dispersed to an ideal condition by mixing them in a ball mill or pebble mill for a minimum of 30 minutes to a maximum of 72 hours.

The compound relating to this invention can create a coated film or can harden the film by infiltrate the compound in or coated on the object with normal process and then dried in air or by heating and, if needed, can be heated under predetermined temperature for some hours in the range not to deteriorate the object. The created film can adhere well to rubber or rubber-like high molecular weight object and possesses solidity not to be destroyed by the effect of elongation, bending and contraction causes by external force and shows slippery and non-adhesive characteristics which is peculiar to fluorocarbonpolymer.

Quoted hereunder are several examples of practical experiment for reference relating to this invention:

Practical Experiment I (1) Polyurethane Rubber Solution

The pellets of 125 parts in weight of thermoplastic urethane rubber of polyester group as manufactured by Nippon Elastollan Industries Ltd. with the trade name "ELASTOLLAN E185PM00" which is an adipate type thermoplastic polyurethane having Shore Hardness 85° and 87.5 part in weight of tetrahydrofran (to be abbreviated to THF hereunder) are mixed and agitated in a proper agitator at normal temperature to produce a homogeneous rubber solution. The viscosity of the solution at temperature 25° C. is 30–50 CPS.

(2) Fluorocarbon organosol 35 weight % of mixed organosol solution composing of PTFE/FEP=5/95 produced by the method explained in the Japanese Patent Gazette No. SHO 48-17548 was applied.

(3) Adhesive Strength Reinforcing Agent

Polyurethane Binding Agent Solution "NIPPOL-LAN-2304", an adipate type thermoplastic polyurethane, as manufactured by Nippon Polyurethane Industries, Ltd., was used. This binding agent is a solution of 35 weight % methylethylketon and its viscosity at temperature 24° C. is 20,000–40,000 CPS.

(4) The Manufacture of Compound for Coating Film Containing Fluorocarbon and the result of the Experiment 672 g of 125 weight % soft thermoplastic polyurethane rubber solution (1), 400 g of 35 weight % fluorocarbon organosol (2) and 160 g of 35 weight % "NIPPOLLAN" (3) were simultaneously put into a pot mill of 2 liter capacity and agitated to mix them for 48 hours with 110 r.p.m. at 23° C.

Then the content was taken out of the pot mill and filtered through a 120 mesh wire gauze.

Solids bodies included in the compound were 22.75 weight %. The above solution of compound containing fluorocarbon for coating was sprayed on the surface of a plate in size of 50 mm w.×100 mm l.×2 mm t. made of non adhesive PTFE and dried in air and further baked in an electric oven for 30 minutes at 150° C. and then a film of 100 mu thickness was peeled away from the plate and the result of test made in compliance with the standard of JIS K-6301 showed good toughness and extending properties with high percentage of elongation as 380–420%.

The same coating compound was sprayed on the surface of an aluminum plate and a plate of polyester group thermoplastic urethane rubber as manufactured by Nippon Elastollan Industries Ltd. with the trade name "ELASTOLLAN E195FNAT", an adipate type thermoplastic polyurethane having Shore Hardness 95° (size of each plate 50 mm w.×100 mm l.×2 mm t.) and they were dried in air and further baked in an electric oven for 30 minutes at 150° C. The both plates have shown very good adhesion and flexibility of the coated films on them. The results of tests on coefficient of friction, resistance against abrasion, bending, etc. of the film prepared for the above practical experiment I and other films of different material are shown and compared in the list below.

| TEST ITEM | | COMPOUND OF EXPERIMENT 1 | PTFE | Nylon 6 | Polyurethane rubber HS 85° |
|---|---|---|---|---|---|
| COEFFICIENT OF FRICTION | | 0.055–0.03 | 0.03 | 0.07 | 0.34 |
| TABER SYSTEM ABRASION TEST (mg) | | 6 | 17 | 7.4 | 2.4 |
| NUMBERS OF BENDING REPEATED UNTIL CRACKING OF FILM | | more than 200,000 | — | — | more than 200,000 |
| PEEL OFF STRENGTH (25° C.) (kg/25 mm) | Aluminum Plate | 5.6 | — | — | — |
| | HS95° Polyurethane Plate | CAN NOT PEEL OFF | | | |

Coefficient of Friction: Measured by Bowden, Leven Type tester with 8 mm dia. steel ball at speed of 0.23 cm/sec. for load 1 kg.
Taber Abrasion Test: Tested by Taber Abrasion Tester indicated mg value after 1,000 revolutions using an Abrasion Wheel No. CB 17 for load 1 kg.
Numbers of Bending: Tested on a DeMattia Flexing Tester by making bend 300 times per minute from 78 mm maximum stroke to 22 mm minimum stroke at 25° C. and indicated by numbers of bending until the point of time when crack started on the specimen.
Peel Off Strength: Tested in compliance with JIS K-6301.

Practical Experiment 2

(1) Polyurethane Rubber Solution 20 weight part of "ELASTOLLAN E185PM00" as specified in Practical Experiment No. 1 and 80 weight part of THF were mixed and agitated to make the solution. The viscosity of the solution at 24° C. is 100–120 CPS. This solution is indicated as Urethane Rubber in the list below.

(2) Fluorocarbon Organosol 35 weight % mixed organosol solution of PTFE/FEP=10/90 was produced by the method explained in the Japanese Patent Gazette No. SHO 18-17548.

(3) Adhesive Strength Reinforcing Agent

Epoxy resin "ARALDITE AW106" which is epichlorhydrin 4'-glycidyl oxyphenyl propane and hardner "HV953U" an aliphatic polyamidamine both as manufactured by Ciba-Geigy, Switzerland, dissolved together by mixed solvent of THF and methylisobuthylketon was used as ingredient.

| INGREDIENT | SPECIMEN NO. | | |
|---|---|---|---|
| | 1 | 2 | 3 |
| Urethane Rubber Solution | 320 (g) | 380 (g) | 450 (g) |
| Organosol | 360 | 360 | 350 |
| AW 106 | 56 | 45 | 28 |
| HV953U | 44 | 35 | 22 |
| THF | 150 | 120 | 100 |
| Methylisobuthylketon | 60 | 50 | 40 |

The ingredients in the above list were put into a ball mill pot of 2 liter capacity and mixed for 72 hours with 110 r.p.m. at 25° C. and then the content was taken out of the pot and filtered through a 120 mesh metallic gauze.

Solid bodies contained in the compound (1) was 29.29 weight %. Each of the above solution of fluorocarbon contained compound was sprayed on the surface of non-adhesive PTFE plate with dimensions of 50 mm w.×100 mm l.×2 mm. t. and dried in air and further baked in an electric oven for 10 minutes at 150° C. Each of the film of about 100 mu thickness was peeled away from the plate showed characteristics of rich in elongation and strong in bending.

Each of the enamel of the compound was sprayed on the surface of an aluminum plate and a nitrile rubber plate of Shore Hardness 70° and dried in air and further baked in an electric oven for 10 minutes at 150° C. has shown its good adhesion and flexibility with the object.

The result of the test on coefficient of friction, abrasion resistance, peel off strength and elongation of films taken from each coated plate are shown in the list below.

| TEST ITEM | | SPECIMEN NUMBER | | |
|---|---|---|---|---|
| | | 1 | 2 | 3 |
| Coefficient of Friction | | 0.04–0.045 | 0.045–0.048 | 0.045–0.05 |
| Taber Abrasion (mg) | | 12 | 8 | 6 |
| Elongation (%) | | 250 | 290 | 320 |
| PEEL OFF Strength (25° C.) (kg/25 mm) | Aluminum | 8.0 | 6.5 | 4.3 |
| | HS 70° Nitrile Rubber | 7.2 | 5.8 | 4.3 |

Practical Experiment 3

100 g of chloroprene rubber (manufactured by TOYO SODA INDUSTRIES LTD, with the trade name "SKYPRENE G-40") was dissolved in a mixed solvent consisting of 400 g of n-hexanon and 400 g of ethyl-acetate and then to this solution was added 100 g of fine powder FEP (manufactured by Daikin Industries Ltd. with the trade name "NEOFLON N-10"), 30 g of alkyl-phenol resin (manufactured by Hitachi Chemical Industries, Ltd., with the trade name "HITANOL 1501," a novolac type phenol resin synthesized from alkyl phenol as base material) and 3 g of magnesium oxide and the mixture was put into a ball mill pot of 2 liter capacity and operated for 48 hours with 110 r.p.m. at 23° C.

The content of the ball mill pot was taken out after completion of operation and filtered through a 120 mesh metallic gauze.

The solid bodies contained in the mixed solution was 16.26 weight %.

The enamel produced as described above was sprayed on the surface of plates in size of 200 mm w.×200 mm l.×2 mm t. one of which is made of vulcanized chloroprene rubber and the other is made of nitrile rubber having Shore Hardness 75°. These coated plates were dried in air and further baked in an electric oven for 30 minutes at 150° C. Either of the plates showed good adhesion of the enamel and excellent flexibility of the coated film with the object.

The result of test made on the coated films sprayed on the above plates is shown respectively in the list below.

| | SPECIMEN | |
|---|---|---|
| TEST ITEM | Film taken from Chloroprene Rubber Plate | Film taken from Nitile Rubber Plate |
| Coefficient of Friction* | 0.06 | 0.06 |
| Numbers of Bending (Crack starting) | more than 10,000 | more than 10,000 |
| Peel off Strength (25° C.) (kg/25 mm) | can't peel away | can't peel away |

*Load 200 g.

Practical Experiment 4

90 g of nitrile rubber (manufactured by Nihon Zeon Co. Ltd. with trade name "HYCAR 1042") was dissolved in a mixed solvent of 900 g of methyl-ethyl-keton and 100 g of toluene. To this solution was added 130 g of fine powder PTFE (manufactured by I.C.I. Ltd. England with the trade name "L-169") and 40 g of degenerated phenol resin (manufactured by Durez Co. with the trade name "DUREZ 12687") and 3 g of magnesium oxide and the mixture was put into a ball mill pot of 2 liter capacity and operated for 48 hours with 110 r.p.m. at 23° C.

The content was taken out after completion of mixing operation and filtered through a 120 mesh metallic gauze.

Solid bodies contained in the compound was 23.63 weight %.

The enamel of the compound was sprayed on the surface of plate of vulcanized synthetic rubber as described in the Practical Experiment 3 and dried in air and further baked in an electric oven for 30 minutes at 150° C. and each of them showed very good adhesion of the enamel to the object and excellent flexibility of itself. The result of test made on the coated film on the panel as above are shown in the list below.

| | SPECIMEN | |
|---|---|---|
| TEST ITEM | film on chloroprene rubber plate | film on nitrile rubber plate |
| Coefficient of Friction* | 0.05 | 0.05 |
| Numbers of Bending (Crack starting) | more than 10,000 | more than 10,000 |
| Peel Off Strength (kg/25 mm) | 6.2 | can't peel off |

*Load 200 g

While the invention has been described hereinabove in its preferred form, it is desired to be protected for all forms coming within the claims hereinbelow.

Having thus described my invention, I claim:

1. An improved flexible coating for a flexible heat-degradable substrate having the following essential components present together simultaneously in a percent by weight ratio based on the total weight of said coating, said essential components are (A) fluorocarbon present in said coating in an amount between 20 percent and 80 percent by weight, and (B) a thermosetting resin present in said coating in an amount between 4 percent and 14 percent by weight, said thermosetting resin selected from the group consisting of an epoxy resin, an alkylphenol resin, and a polyurethane resin which is entirely thermosetting, and (C) a rubbery elastomer present in said coating in an amount between 76 percent and 6 percent by weight, said rubbery elastomer selected from the group consisting of a nitrile rubber, a chloroprene rubber, and a rubbery polyurethane elastomer which is entirely thermoplastic, all three essential components defined as said fluorocarbon, said thermosetting resin, and said rubbery elastomer being present simultaneously together for flexibility of said coating on said heat-degradable substrate.

2. An improved flexible coating for a flexible heat-degradable substrate having the following essential components present together simultaneously in a percent by weight ratio based on the total weight of said coating, said essential components are (A) fluorocarbon present in said coating in an amount between 20 percent and 80 percent by weight, and (B) an alkylphenol thermosetting resin present in said coating in an amount between 4 percent and 14 percent by weight, and (C) nitrile rubber present in said coating in amount between 76 percent and 6 percent by weight, all said three essential components being present simultaneously together for flexibility of said coating on said heat-degradable substrate.

3. An improved flexible coating for a flexible heat-degradable substrate having the following essential components present together simultaneously in a percent by weight ratio based on the total weight of said coating, said essential components are (A) fluorocarbon present in said coating in an amount between 20 percent and 80 percent by weight, and (B) an alkylphenol thermosetting resin present in said coating in an amount between 4 percent and 14 percent by weight, and (C) chloroprene rubber present in said coating in an amount between 76 percent and 6 percent by weight, all said three essential components being present simultaneously together for flexibility of said coating on said heat-degradable substrate.

4. An improved flexible coating for a flexible heat-degradable substrate having the following essential components present together simultaneously in a percent by weight ratio based on the total weight of said coating, said essential components are (A) fluorocarbon present in said coating in an amount between 20 percent and 80 percent by weight, and (B) a thermosetting resin present in said coating in an amount between 8 percent and 12 percent by weight, said thermosetting resin selected from the group consisting of an epoxy resin, an alkylphenol resin, and a polyurethane resin which is entirely thermosetting, and (C) a rubbery elastomer present in said coating in an amount between 72 percent and 8 percent by weight, said rubbery elastomer selected from the group consisting of a nitrile rubber, a chloroprene rubber, and a rubbery polyurethane elastomer which is entirely thermoplastic, all three essential components defined as said fluorocarbon, said thermosetting resin, and said rubbery elastomer present simultaneously together for flexibility of said coating on said heat-degradable substrate.

5. An improved flexible coating for a flexible heat-degradable substrate having the following essential components present together simultaneously in a percent by weight ratio based on the total weight of said coating, said essential components are (A) fluorocarbon present in said coating in an amount between 20 percent and 80 percent by weight, and (B) an alkylphenol thermosetting resin present in said coating in an amount between 8 percent and 12 percent by weight, and (C) nitrile rubber present in said coating in an amount between 72 percent and 8 percent by weight, all said three essential components being present simultaneously together for flexibility of said coating on said heat-degradable substrate.

6. An improved flexible coating for a flexible heat-degradable substrate having the following essential components present together simultaneously in a percent by weight ratio based on the total weight of said coating, said essential components are (A) fluorocarbon present in said coating in an amount between 20 percent and 80 percent by weight, and (B) an alkylphenol thermosetting resin present in said coating in an amount between 8 percent and 12 percent by weight, and (C) chloroprene rubber present in said coating in an amount between 72 percent and 8 percent by weight, all said three essential components being present simultaneously together for flexibility of said coating on said heat-degradable substrate.

7. An improved flexible coating for a flexible heat-degradable substrate having the following essential components present together simultaneously in a percent by weight ratio based on the total weight of said coating, said essential components are (A) fluorocarbon present in said coating in an amount between 30 percent and 60 percent by weight, and (B) a thermosetting resin present in said coating in an amount between 3.5 percent and 28 percent by weight, said thermosetting resin selected from the group consisting of an epoxy resin, an alkylphenol resin, and a polyurethane resin which is entirely thermosetting, and (C) a rubbery elastomer present in said coating in an amount between 66.5 percent and 12 percent by weight, said rubbery elastomer selected from the group consisting of a nitrile rubber, a chloroprene rubber, and a rubbery polyurethane elastomer which is entirely thermoplastic, all three essential components defined as said fluorocarbon, said thermosetting resin, and said rubbery elastomer being present simultaneously together for flexibility of said coating on said heat-degradable substrate.

8. An improved flexible coating for a flexible heat-degradable substrate having the following essential components present together simultaneously in a percent by weight ratio based on the total weight of said coating, said essential components are (A) fluorocarbon present in said coating in an amount between 30 percent and 60 percent by weight, and (B) an alkylphenol thermosetting resin present in said coating in an amount between 3.5 percent and 28 percent by weight, and (C) nitrile rubber present in an amount between 66.5 percent and 12 percent by weight, all said three essential components being present simultaneously together for flexibility of said coating on said heat-degradable substrate.

9. An improved flexible coating for a flexible heat-degradable substrate having the following essential components present together simultaneously in a percent by weight ratio based on the total weight of said coating, said essential components are (A) fluorocarbon present in said coating in an amount between 30 percent and 60 percent by weight, and (B) an alkylphenol thermosetting resin present in said coating in an amount between 3.5 percent and 28 percent by weight, and (C) chloroprene rubber present in said coating in an amount between 66.5 percent and 12 percent by weight, all said three essential components being present simultaneously together for flexibility of said coating on said heat-degradable substrate.

10. An improved flexible coating for a flexible heat-degradable substrate having the following essential components present together simultaneously in a percent by weight ratio based on the total weight of said coating, said essential components are (A) fluorocarbon present in said coating in an amount between 30 percent and 60 percent by weight, and (B) a thermosetting resin present in said coating in an amount between 7 percent and 24 percent by weight, said thermosetting resin selected from the group consisting of an epoxy resin, an alkylphenol resin, and a polyurethane resin which is entirely thermosetting, and (C) a rubbery elastomer present in said coating in an amount between 63 percent and 16 percent by weight, said rubbery elastomer selected from the group consisting of a nitrile rubber, a chloroprene rubber, and a rubbery polyurethane elastomer which is entirely thermoplastic, all three essential components defined as said fluorocarbon, said thermosetting resin, and said rubbery elastomer being present simultaneously together for flexibility of said coating on said heat-degradable substrate.

11. An improved flexible coating for a flexible heat-degradable substrate having the following essential components present together simultaneously in a percent by weight ratio based on the total weight of said coating, said essential components are (A) fluorocarbon present in said coating in an amount between 30 percent and 60 percent by weight, and (B) an alkylphenol thermosetting resin present in said coating in an amount between 7 percent and 24 percent by weight, and (C) nitrile rubber present in said coating in an amount between 63 percent and 16 percent by weight, all said three essential components being present simultaneously together for flexibility of said coating on said heat-degradable substrate.

12. An improved flexible coating for a flexible heat-degradable substrate having the following essential components present together simultaneously in a percent by weight ratio based on the total weight of said coating, said essential components are (A) fluorocarbon present in said coating in an amount between 30 percent and 60 percent by weight, and (B) an alkylphenol thermosetting resin present in said coating in an amount between 7 percent and 24 percent by weight, and (C) chloroprene rubber present in said coating in an amount between 63 percent and 16 percent by weight, all said three essential components being present simultaneously together for flexibility of said coating on said heat-degradable substrate.

13. An improved composition for use in making the coating of claim 1 on a heat-degradable substrate having the following essential components in a percent by weight ratio based on the total weight of the composition, said essential components are (A) fluorocarbon in amount between 20 percent and 80 percent by weight, and (B) a thermosetting resin in an amount between 4 percent and 14 percent by weight, said thermosetting resin selected from the group consisting of an epoxy resin, an alkylphenol resin, and a polyurethane resin which is entirely thermosetting, and (C) a rubbery elastomer in an amount between 76 percent and 6 percent by weight, said rubbery elastomer selected from the group consisting of a nitrile rubber, a chloroprene rubber, and a rubbery polyurethane elastomer which is entirely thermoplastic, all said three essential components defined as said fluorocarbon, said thermosetting resin, and said rubbery elastomer being present simultaneously together in said composition.

14. An improved composition for use in making the coating of claim 1 on a heat-degradable substrate having the following essential components in a percent by weight ratio based on the total weight of the composition, said essential components are (A) fluorocarbon present in an amount between 20 percent and 80 percent by weight, and (B) alkylphenol present in an amount between 4 percent and 14 percent by weight, and (C) nitrile rubber present in an amount between 76 percent and 6 percent by weight, all said three essential components being present in said composition to impart flexibility to said coating on a heat-degradable substrate.

15. An improved composition for use in making the coating of claim 1 on a heat-degradable substrate having the following essential components in a percent by weight ratio based on the total weight of said composition, said 80 percent by weight, and (B) alkylphenol present in an amount between 4 percent and 14 percent by weight, and (C) chloroprene rubber present in an amount 76 percent and 6 percent by weight, all said three essential components being present in said composition to impart flexibility to said coating on a heat-degradable substrate.

16. An improved composition for use in making the coating of claim 4 on a heat-degradable substrate having the following essential components in a percent by weight ratio based on the total weight of the composition, said essential components are (A) fluorocarbon in an amount between 20 percent and 80 percent by weight, and (B) a thermosetting resin in an amount between 8 percent and 12 percent by weight, said thermosetting resin selected from the group consisting of an epoxy resin, and alkylphenol resin, and a polyurethane resin which is entirely thermosetting, and (C) a rubbery elastomer in an amount between 72 percent and 8 percent by weight, said rubbery elastomer selected from the group consisting of a nitrile rubber, a chloroprene rubber, and a rubbery polyurethane elastomer which is entirely thermoplastic, all said essential components defined as said fluorocarbon, said thermosetting resin, and said rubbery elastomer being present together simultaneously in said composition.

17. An improved composition for use in making the coating of claim 4 on a heat-degradable substrate having the following essential components in a percent by weight ratio based on the total weight of said composition, said essential components are (A) fluorocarbon present in an amount between 20 percent and 80 percent by weight, and (B) an alkylphenol thermosetting resin present in an amount between 8 percent and 12 percent by weight, and (C) nitrile rubber present in an amount of between 72 percent and 8 percent by weight, all said three essential components being present in said composition to impart flexibility to said coating on a heat-degradable substrate.

18. An improved composition for use in making the coating of claim 4 on an heat-degradable substrate having the following essential components in a percent by weight ratio based on the total weight of said composition, said essential components are (A) fluorocarbon present in an amount between 20 percent and 80 percent by weight, and (B) an alkylphenol thermosetting resin present in an amount between 8 percent and 12 percent by weight, and (C) chloroprene rubber present in an amount between 72 percent and 8 percent by weight, all said three components being present in said composition to impart flexibility to said coating on a heat-degradable substrate.

19. An improved composition for use in making the coating of claim 7 on a heat-degradable substrate having the following essential components in a percent by weight ratio based on the total weight of said composition, said essential components are (A) fluorocarbon in an amount between 30 percent and 60 percent by weight, and (B) a thermosetting resin in an amount between 3.5 percent and 28 percent by weight, said thermosetting resin selected from the group consisting of an epoxy resin, an alkylphenol resin, and a polyurethane resin which is entirely thermosetting, and (C) a rubbery elastomer in an amount between 66.5 percent and 12 percent by weight, said rubbery elastomer selected from the group consisting of a nitrile rubber, a chloroprene rubber, and a rubbery polyurethane elastomer which is entirely thermoplastic, all said three essential components defined as said fluorocarbon, said thermosetting resin, and said rubbery elastomer being present together simultaneously in said composition.

20. An improved composition for use in making the coating of claim 7 on a heat-degradable substrate having the following essential components in a percent by weight ratio based on the total weight of said composition, said essential components are (A) fluorocarbon in an amount between 30 percent and 60 percent by weight, and (B) an alkylphenol thermosetting resin present in an amount between 3.5 percent and 28 percent by weight, and (C) nitrile rubber present in an amount between 66.5 percent and 12 percent by weight, all said three essential components being present in said composition to impart flexibility to said coating on a heat-degradable substrate.

21. An improved composition for use in making the coating of claim 7 on a heat-degradable substrate having the following essential components in a percent by weight ratio based on the total weight of said composition, said essential components are (A) fluorocarbon in an amount between 30 percent and 60 percent by weight, and (B) an alkylphenol thermosetting resin present in an amount between 3.5 percent and 28 percent by weight, and (C) nitrile rubber present in an amount between 66.5 percent and 12 percent by weight, all said three essential components being present in said composition to impart flexibility to said coating on a heat-degradable substrate.

22. An improved composition for use in making the coating of claim 10 on a heat-degradable substrate having the following essential components in a percent by weight ratio based on the total weight of said composition, said essential components are (A) fluorocarbon in an amount between 30 percent and 60 percent by weight, and (B) a thermosetting resin in an amount between 7 percent and 24 percent by weight, said thermosetting resin selected from the group consisting of an epoxy resin, an alkylphenol resin, and a polyurethane resin which is entirely thermosetting, and (C) a rubbery elastomer in an amount between 63 percent and 16 percent by weight, said rubbery elastomer selected from the group consisting of a nitrile rubber, a chloroprene rubber, and a rubbery polyurethane elastomer which is entirely thermoplastic, all said three essential components defined as said fluorocarbon, said thermosetting resin, and said rubbery elastomer being present together simultaneously in said composition.

23. An improved composition for use in making the coating of claim 10 on a heat-degradable substrate having the following essential components in a percent by weight ratio based on the total weight of said composition, said essential components are (A) fluorocarbon in an amount between 30 percent and 60 percent by weight, and (B) a alkylphenol thermosetting resin in an amount between 7 percent and 24 percent by weight, and (C) a nitrile rubber in an amount between 63 percent and 16 percent by weight, all said three essential components present in said composition to impart flexibility to said coating on a heat-degradable substrate.

24. An improved composition for use in making the coating of claim 10 on a heat-degradable substrate having the following essential components in a percent by weight ratio based on the total weight of said composition, said essential components are (A) fluorocarbon in an amount between 30 percent and 60 percent by weight, and (B) an alkylphenol thermosetting resin in an amount between 7 percent and 24 percent by weight, and (C) chlorprene rubber in an amount between 63 percent and 16 percent by weight, all said three essential components present in said composition to impart flexibility to said coating on a heat-degradable substrate.

* * * * *